United States Patent

[11] 3,618,692

[72] Inventor Larry F. Stikeleather
 Hales Corners, Wis.
[21] Appl. No. 873,929
[22] Filed Nov. 4, 1969
[45] Patented Nov. 9, 1971
[73] Assignee Universal Oil Products Company
 Des Plaines, Ill.

[54] VEHICLE CAB SUSPENSION
 7 Claims, 2 Drawing Figs.
[52] U.S. Cl. .................................................. 180/89,
 296/35 R
[51] Int. Cl. ................................................ B62d 33/06
[50] Field of Search .......................................... 296/35 R,
 28 C, ; 180/89

[56] References Cited
UNITED STATES PATENTS
| | | | |
|---|---|---|---|
| 1,071,335 | 8/1913 | Pembroke .................... | 180/89 |
| 2,502,622 | 4/1950 | Harris.......................... | 180/89 |
| 3,420,568 | 1/1969 | Henriksson et al. .......... | 296/35 C |

OTHER REFERENCES
German Printed Application DAS 1,107,526, 5/1951, Winkle, 180/89 (1 sht. dwg.- 3 pp. spec.)

Primary Examiner—Benjamin Hersh
Assistant Examiner—John A. Pekar
Attorneys—James R. Hoatson, Jr. and Philip T. Liggett ABSTRACT: An improved vehicle in which a structure extends upward from the front of the vehicle frame. A lateral arm is attached to the structure and extends rearward, where it is attached to the cab unit. A spring means suspends the cab above the vehicle frame.

INVENTOR:
Larry F. Stikeleather

INVENTOR:
Larry F. Stikeleather

BY: James R. Hoatson, Jr.
Philip T. Liggett
ATTORNEYS

VEHICLE CAB SUSPENSION

This invention relates to an improved vehicle having a frame, functional operating means, vehicle controls, and flexible linkage connecting the controls to the functional operating means. More particularly this invention is a structure extending upward from the front of the vehicle frame with a lateral arm attached to the support at one end. The other end of the arm extends rearward where it is attached to a cab unit.

Currently the operators of most motor vehicles are insulated by means of seat suspensions from shocks and vibrations imparted from the moving vehicles. Seat suspensions have been highly developed and a great number of alternative seat suspension systems are available. All seat suspension systems are inferior to a complete suspension of a vehicle cab unit in several respects, however. While seat suspension systems insulate the operator's torso from vehicle vibrations, the operator's limbs receive these vibrations from the vehicle controls through which the vehicle is operated. More specifically, the operator's hands are usually on the steering wheel and his feet are usually positioned against the floor, gas pedal, clutch, or brake. As a result there is a great deal of vibrational movement of the operator's hands and feet with respect to his torso. This particular type of movement is quite fatiguing and impedes the operator's efficiency and safety in operating the vehicle.

The few existing cab unit suspension designs reduce the number and extent of vibrations transmitted to the operator's limbs, but entail the disadvantage of requiring an elaborate spring support mechanism. This spring support mechanism guides the vehicle cab in a vertical path with respect to the vehicle. This motion continually tends to change the plane of the vehicle operator's line of sight, thereby unnecessarily tiring his eyes. The movement of the cab of this invention in an arc about the front of the vehicle at the level of the upper torso of the vehicle operator tends to keep the operator's line of sight on the road in front of him without requiring him to refocus.

Most existing cab suspension units for offroad vehicles entail a great deal of cab movement with respect to the vehicle hood and involve an open interface between the hood and the cab unit. This interface is rather unsightly and presents definite styling problems in the vehicle design. In addition, dirt and debris tend to collect in the interface and at times impede the movement of the cab unit with respect to the vehicle. Cab units suspended from overhead roll bars or other supports present additional problems. The supports often interfere with the operator's vision to the side or rear. Also, there is a design problem in positioning the supports so as to provide for the cab suspension, yet allow the doors of the vehicle cab to open unobstructed.

One particular type of cab suspension which has proved somewhat successful is the attachment of the cab unit by means of a long arm to the front portion of the vehicle. The arm has the effect of causing the cab to oscillate in an arc about the front of the vehicle at the level of the vehicle frame. This design has the disadvantage of causing discomfort to the operator due to the force and aft motion and the acceleration experienced by the operator, especially at head level. This type of motion occurs because the pivot point is low rather than raised, as is the pivot point or point of attachment of the arm of this invention.

It is an object of the present invention to support an entire cab unit and guide the cab unit in oscillating in an arc about a point above the front of the vehicle at about the level of the upper torso of the vehicle operator.

It is another object to eliminate the interface between the cab unit and the vehicle hood. This allows greater flexibility in the vehicle design and eliminates a place for dirt and debris to collect.

In one preferred form of this invention, the lateral beam to which the cab unit is attached is a cantilever arm rigidly attached to the upright support of the front of the vehicle. This construction eliminates the need for a separate elaborate spring support system since the flexibility of the free end of the arm acts as a spring means suspending and supporting the cab unit.

In another preferred form of this invention, the cab unit may be swung up and away from the vehicle frame, thereby exposing the power train of the vehicle for servicing and repair.

Other advantageous features which can be incorporated into this invention include a roll bar which is integral with the cab unit, rather than with the frame of the vehicle. This will prevent a vehicle operator from being crushed between the roll bar and the floor or walls of the cab unit should the vehicle overturn. Further protection is afforded the operator using this invention if protective side panels extend around the cab unit for roll over and impact protection.

Another object of this invention is to create a suspended cab arrangement where the operator's vision is directed predominantly along the path of the vehicle, and not toward the ground or in the air during the oscillation of the cab unit with respect to the vehicle.

In a broad aspect this invention is, in a vehicle having a frame, functional operating means, vehicle controls, and flexible linkage connecting said controls to said functional operating means, the improvement comprising a structure connected to said frame at the front of said vehicle and extending upward from said frame; a lateral arm having a first end attached to said structure above said frame and having a second end extending rearward from said structure; a vehicle cab unit, comprising a floor and a seat and having said controls mounted therein, attached to said second end of said arm; and a spring means biasing said cab unit away from said frame.

In one useful construction, the first end of the arm is pivotally attached to the structure of the front of the vehicle, and the spring means is interposed between the cab unit and the frame. This pivotal manner of attachment is particularly useful when it is desired to rotate the cab unit upward and overhead about the support in order to service the vehicle.

In another preferred embodiment this invention is, in a vehicle having a frame, functional operating means, vehicle controls, and flexible linkage connecting said controls to said functional operating means, the improvement comprising a support structure connected to said frame at the front of said vehicle and extending upward from said frame; a lateral cantilever arm having a fixed end attached to said support structure above said frame and having a free end extending rearward from said support structure; and a vehicle cab unit, comprising a floor and a seat and having said controls mounted therein, supported by said fixed end of said cantilever arm which also acts as a spring means.

As applied to this invention, the term "functional operating means" includes those mechanisms of the vehicle which directly effect changes in the manner of travel of the vehicle. The term functional operating means includes brakes, steering linkage connections at the vehicle wheels, a transmission, and a carburetor or fuel injection means. Peripheral operating systems, such as headlights, taillights, turn signals, and so forth, may also be classified as functional operating means. The vehicle controls include the conventional controls found at the operator position in every vehicle. These controls include in all cases the steering wheel or steering levers, brake pedal, accelerator or throttle, and transmission ratio selection means. Usually there are other controls involved, such as headlight and taillight switches, hydraulic controls for auxiliary equipment, and a directional turn indicator lever. The windshield wiper assembly and its control are normally located in the cab in its entirety, with the only connection link associated therewith being the electric cable to the battery.

The flexible linkage connecting the vehicle controls to the functional operating means is of the conventional type such as hydraulic, pneumatic, electrical, and some mechanical connectors. Some of the more commonly supplied or commonly available major systems involving flexible linkage include automatic transmissions, airbrakes, power brakes, and power steering. Flexible linkage is also available to provide suitable connections to the accelerator, standard hydraulic brakes, and all electrical connections.

In some embodiments of this invention there is a cushioning means interposed between the frame and the cab unit. This cushioning means may be any of the conventional cushioning systems used in seat and cab suspension. Prevalent among these are air springs, coil springs, air-oil hydraulic cylinders, shock absorbers, and pneumatic cylinders. The use of these conventional cushioning means tends to provide a smoother ride to the vehicle operator by diminishing the vertical acceleration occurring at the extreme positions of the cab unit during oscillation of the cab unit with respect to the frame.

Another preferred embodiment of the invention exists where the cab unit is further comprised of a roll bar extending over the top of the cab unit. A roll bar is often required and even more frequently provided in vehicles having a high center of gravity to protect the vehicle operator should the vehicle overturn. The advantage of a roll bar as used in conjunction with the other elements of this invention is that it is a part of the cab unit rather than an extension from the vehicle frame. This arrangement will prevent the vehicle operator and the cab from being thrown against the roll bar should the vehicle overturn.

Another refinement of this invention exists where a hood over the engine of the vehicle is attached to the arm used in this invention. In this modification of the invention, the arm is substantially horizontal at hood height. The hood thereby provides a substantially horizontal cover over the engine of the vehicle, such as is common with conventional hoods.

Since an imaginary horizontal line from the point of attachment of the lateral arm to the upright structure at the front of the vehicle passes through the upper torso of the vehicle operator, the operator's line of sight is for the most part unaffected by relative motion between cab and vehicle. This is due to the fact that a line, normal to the tangent plane of the arc of oscillation at eye level, slopes down and to the front at an angle of from about 1° to only about 30°, usually at an angle less than 10°. This small angle of slope insures that there will be no great deviation in the operator's line of sight during oscillation of the cab unit. The arc of oscillation of the cab unit extends approximately an equal distance both above and below a horizontal plane passing through the point of attachment of the lateral arm to the support at the front of the vehicle. While the lateral arm is frequently horizontal it may slope down to the rear and be attached to the cab unit near the floor of the cab unit, it may slope up to the rear and be attached to the upper structure of the cab unit, or it may extend vertically downward at the support structure, and then horizontally rearward. It is only essential that the front end of the arm which is attached to the support at the front of the vehicle be in an imaginary horizontal plane passing approximately through the upper torso of the vehicle operator. The lateral arm may be comprised of a single beam or several horizontally spaced branches to insure stability.

In one preferred arrangement, the lateral arm is pivotally attached to the support, whereby the arm and the cab may be rotated overhead about the support, thereby exposing the power train of the vehicle for servicing. This ease of servicing will greatly reduce the time required to perform both routine and remedial maintenance to the vehicle power train, especially the vehicle transmission, drive shaft, and differential gear system.

Some of the various embodiments and modifications of this invention are more clearly illustrated in the accompanying drawings in which.

Figure 1:
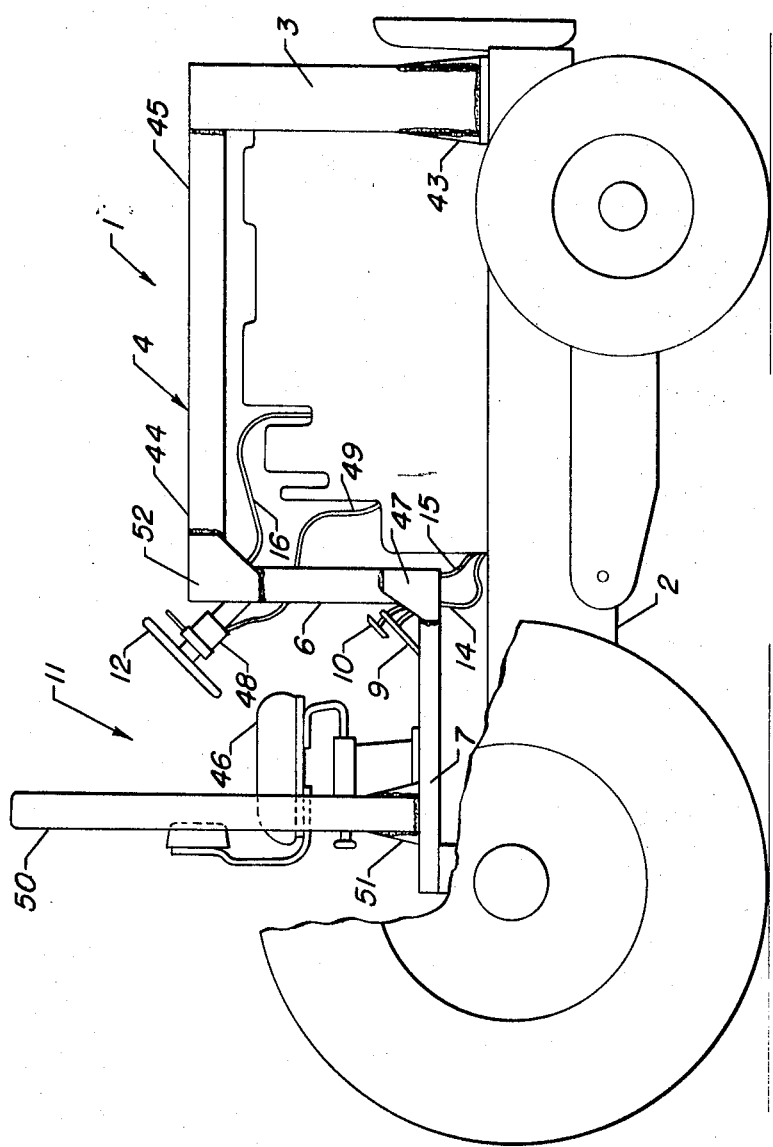
FIG. 1 is an elevational view of a farm tractor employing one preferred embodiment of this invention.

Referring now to FIG. 1, there is shown a farm tractor 1 with a portion of one rear wheel broken away for the sake of clarity. Tractor 1 has a frame 2 as the basic load-bearing structure of the vehicle. A support structure is comprised of two supports 3 connected to frame 2, one on each side of tractor 1, at the front of the vehicle. Supports 3 extend upward from frame 2. Each support 3 is welded to a supporting angle 43. The supporting angle 43 in turn is welded to frame 2, thereby securing the supports 3 to frame 2. To the upper part of supports 3 is attached a lateral cantilever arm 4. Cantilever arm 4 is a channel with the open face turned downward. The back of arm 4 spans the distance between the supports 3. Cantilever arm 4 is comprised of a fixed end 45 and a free end 44. Fixed end 45 of cantilever arm 4 is welded to each support 3 above frame 2. The free end 44 of cantilever arm 4 extends rearward from supports 3 and is attached to a vehicle cab unit 11. Vehicle cab unit 11 is comprised of a floor 7, a seat 46, vehicle controls, a roll bar 50, and a front connecting structure 6. Connecting structure 6 is attached at right angles to free end 44 of cantilever arm 4 by means of a connecting plate 52 welded on each side of arm 4. The lower portion of connecting structure 6 is attached to floor 7 of the vehicle cab unit 11 by connecting plates 47 on each side of tractor 1. Each connecting plate 47 is welded to the adjacent part of connecting structure 6 and to the floor 7. The vehicle controls include the steering wheel 12, the accelerator pedal 9, the brake pedal 10, and a transmission selection assembly 48. All of these vehicle controls are connected to the functional operating means of the vehicle. The steering wheel 12 is hydraulically connected to the front wheel linkage by means of a hydraulic hose 16. Accelerator pedal 9 is connected to the carburetor by means of of a flexible control cable 14, and brake pedal 10 is connected to the vehicle brakes through the master cylinder by means of a hydraulic tube 15. The transmission selection assembly 48 is connected to the transmission by means of a hydraulic line 49.

It can be seen that as the vehicle travels along a road or rough terrain, the cab unit 11 tends to oscillate with respect to the vehicle frame 2 in an arc about the fixed end 45 of cantilever arm 4 where it is joined to supports 3. Since the oscillation of cab unit 11 is about the junction of fixed end 45 of cantilever arm 4 with supports 3 which is at the same elevation as is the upper torso of the vehicle operator, the operator's line of sight does not deviate a great deal during the oscillation of the cab unit 11. The pitching and fore-and-aft motion and acceleration experienced by the operator is also substantially improved by the high pivot point as opposed to a pivot point near the junction of supports 3 with frame 2.

Roll bar 50 of cab unit 11 is attached to floor 7 of cab unit 11 by means of supporting angles 51 and extends over the top of the cab unit. Roll bar 50 is welded to supporting angles 51, which in turn are welded to floor 7 of cab unit 11. The operator in the seat 46 of the cab unit is protected by roll bar 50, should the vehicle overturn.

Figure 2:
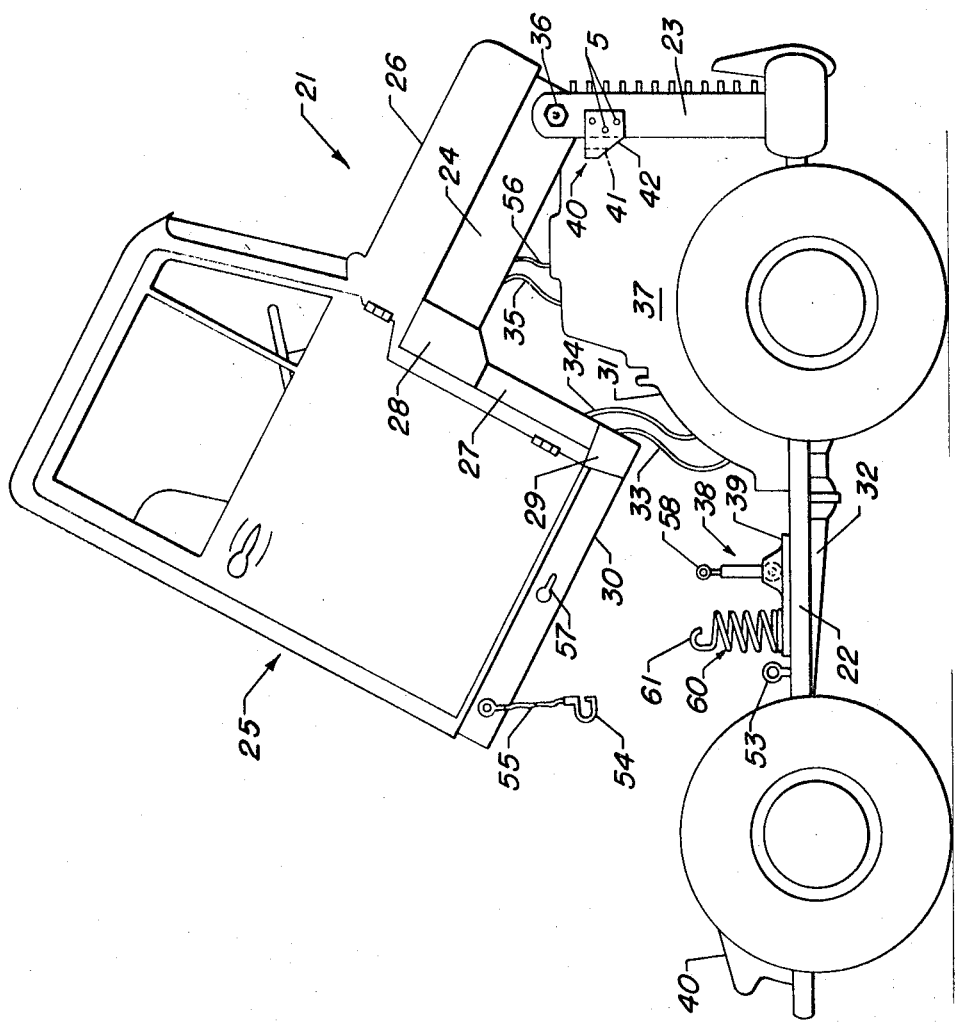
FIG. 2 is an elevational view of another preferred embodiment of this invention as utilized in a tractor unit for a truck.

Another embodiment of this invention is illustrated in FIG. 2. In FIG. 2 there is a truck tractor 21 into which this invention has been incorporated. Truck tractor 21 is comprised of a frame 22 to the front of which a support structure comprising supports 23, is attached. Supports 23 extend upward from frame 22 on each side of truck tractor 21. One end of a lateral arm 24 is pivotally attached to the upper portions of supports 23 by pivot pin assemblies 36 on each side of the vehicle. This manner of attachment enables lateral arm 24 to rotate upwards about supports 23. The arc of rotation of lateral arm 24 is limited in its downward movement by a stopping bracket 40 on each support 23. Stopping bracket 40 is comprised of a back plate 42, positioned against support 23 and bolted thereto by bolts 5, and a lateral extension 41, which extends inwardly directly underneath arm 24. Stopping bracket 40 is positioned high enough on support 23 so that the vehicle cab 25 at the lowest position of oscillation is never allowed to rest directly on frame 22. That is, there is always a clearance between the floor 30 of cab unit 25 and frame 22. The clearance between floor 30 and frame 22 is great enough so that the downward oscillation of cab unit 25 with respect to frame 22 will not be halted by contact between frame 22 and floor 30. Attached to frame 22 is a steel ring 53 and to cab unit 25 is attached a hook 54 on a length of cable 55. In the ride position of the cab unit, hook 54 is engaged in ring 53. This limits the height to which cab unit 25 can rise at its extreme upper position during oscillation. When cab unit 25 is in the ride position, pivot pin assemblies 36 can be tightened so that the attachment of lateral arm 24 to supports 23 is rigid and cab unit 25 will oscillate within the spring limit of cantilever arm 24. To avoid stress on pivot pins 36, however, pins 36 are left in a freely pivotal state and a spring 60 is interposed between cab unit 25 and frame 22. Spring 60 terminates in a hook 61 at its upper end. Hook 61 is engageable in an eye (not shown) in the lower part of cab unit 25. Hook 61 must be disengaged when cab unit 25 is rotated upwards about supports 23 and hook 61 must be reengaged when cab unit 25 is lowered into the ride position above frame 22. Spring 60 is thereby in tension when cab unit 25 is at its upper position in its oscillation about pivot pins 36 during operation of truck tractor 21.

The free end of lateral arm 24 is attached to a front connection section 27 of cab unit 25 by means of connection plates 28. Connection plates 28 are welded to both the free end of lateral arm 24 and to the upper end of the connection section 27 on each side of truck tractor 21. The lower end of connection section 27 is attached to the floor 30 by means of plates 29 welded both to the floor member 30 and the connection section 27. The vehicle controls on the interior of the cab unit 25 are connected to the functional operating means through the flexible hydraulic cables 33, 34, 35 and 56. There is enough slack in each of these cables to allow cab unit 25 to be pivoted upward about bolt and axle assemblies 36 when hook 54 is disengaged from ring 53. Alternatively, the linkages could be designed with quick disconnect provisions.

Extending across the frame 22 of the vehicle 21 is a support platform 39, upon which spring 60 and a shock absorber 38 are positioned. As vehicle cab unit 25 oscillates with respect to frame 22 when it is in the ride position, the shock absorber 38 dampens the oscillation of the cab unit 25 with respect to the frame 22. The shock absorber 38 thereby acts as a vibrational damping unit between the frame 22 and the cab unit 25. While cab 25 is in the ride position, shock absorber 38 is attached to the floor member 30 by means of locking pin 57. Locking pin 57 is spring biased in a lateral direction toward the center of truck tractor 21, thereby passing through the opening in upper sleeve 58 of shock absorber 38. When cab 25 is to be rotated upward for servicing, locking pin 57 is withdrawn to free sleeve 58 and disengage the shock absorber 38 from cab 25. To reattach the shock absorber, cab 25 is merely lowered and locking pin 57 is withdrawn and allowed to spring back into engagement with sleeve 58 of shock absorber 38.

The hook 26 over the engine 37 of the vehicle is attached to lateral arm 24. The hood 26 is carried by the lateral arm 24 and protects the engine and other operating components of the vehicle from weather and from dirt and debris.

Since lateral arm 24 is pivotally attached to a support 23 on each side of the vehicle by means of pivot pin assemblies 36, the lateral arm 24 and the cab unit 25 may be rotated from the ride position overhead about the supports 23, thereby exposing the power train of the vehicle for servicing. Of particular benefit is the access to the drive shaft 32, the transmission 31, and the differential gear system (not visible) between the rear wheels of the vehicle. These parts of the power train are otherwise accessible only from beneath the vehicle, and then only to a limited degree. When the vehicle cab unit 25 is brought back into the ride position, the lateral arm 24 is restrained in its downward movement at the lowest point in the oscillatory cycle by the stopping bracket 40. Hook 61 is reengaged into an accommodating eye in cab unit 25, hook 54 is engaged in ring 53 to limit the upward movement of cab unit 25 during oscillation and locking pin 57 is reengaged into upper sleeve 58 of shock absorber 38. The lower rear edge of the cab unit 25 clears the trailer attachment means 40 as cab unit 25 pivots about pivot pin assemblies 36, so that the trailer attachment means 40 does not interfere with the rotation of cab unit 25.

The foregoing detailed description and illustrations of embodiments of this invention have been given for clearness of understanding only, and no unnecessary limitations should be construed therefrom, as modifications will be obvious to those skilled in the field of vehicle operator seating.

I claim as my invention:

1. In a vehicle having a frame, functional operating means, vehicle controls, and flexible linkage connecting said controls to said functional operating means, the improvement comprising a structure connected to said frame at one end of said vehicle and extending upward from said frame; a lateral arm having a first end attached to said structure at a portion thereof which is at least as high above the frame as the seating surface of a seat in the vehicle, said lateral arm having a second end extending from said structure and overlying a portion of said vehicle; and a vehicle cab unit comprising a floor and said seat and having said controls mounted therein, said cab unit being rigidly mounted to said second end of said lateral arm and extending downwardly therefrom, said cab unit being spaced from said frame and movable relative thereto in a vertical direction against the resistance of a spring means.

2. The vehicle of claim 1 further characterized in that said first end of said arm is pivotally attached to said structure and said spring means is interposed between said cab unit and said frame.

3. The vehicle of claim 2 further characterized in that said arm is pivotally attached to the upper end of said structure, whereby said arm and said cab may be rotated overhead about said structure, thereby exposing the power train of said vehicle for servicing.

4. In a vehicle having a frame, functional operating means, vehicle controls, and flexible linkage connecting said controls to said functional operating means, the improvement comprising: a support structure connected to said frame at the front of said vehicle and extending upward from said frame; a lateral cantilever arm having a fixed end attached to said support structure above said frame and having a free end extending rearward from said support structure; and a vehicle cab unit, comprising a floor and a seat and having said controls mounted therein, an arm extending downwardly from said free end and attached to said cab unit, whereby said cab unit is supported by said fixed end of said cantilever arm which also acts as a spring means.

5. The vehicle of claim 4 further characterized in that there is a cushioning means interposed between said frame and said cab unit.

6. The vehicle of claim 4 further characterized in that a hood over the engine of said vehicle is attached to said cantilever arm.

7. The vehicle of claim 4 further characterized in that said cab unit is further comprised of a roll bar extending over the top of said cab unit.

* * * * *